Aug. 30, 1966 P. E. CROOKSHANKS ETAL 3,270,126
COLOR MATRIX INCLUDING NEGATIVE FEEDBACK
AND A CROSS-FEED CONNECTION
Filed March 18, 1963
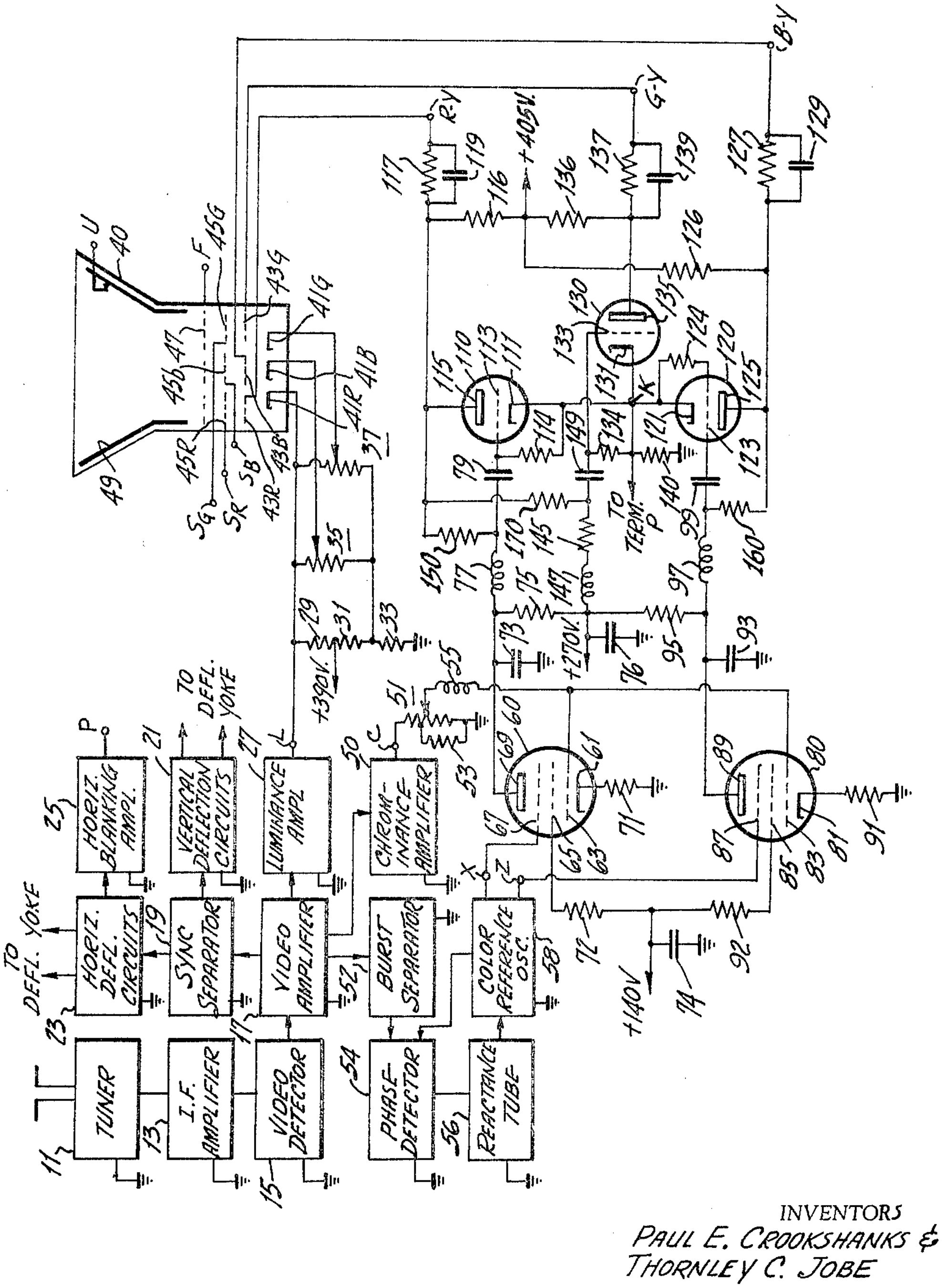
INVENTORS
PAUL E. CROOKSHANKS &
THORNLEY C. JOBE
BY [signature]
Attorney 3,270,126

COLOR MATRIX INCLUDING NEGATIVE FEEDBACK AND A CROSS-FEED CONNECTION

Paul E. Crookshanks and Thornley C. Jobe, Indianapolis, Ind., assignors to Radio Corporation of America, a corporation of Delaware Filed Mar. 18, 1963, Ser. No. 265,951
7 Claims. (Cl. 178—5.4)

This invention is directed to matrix circuitry and, in particular, to matrix circuitry of the type useful in processing color information signals for utilization by devices such as a color image reproducer.

Pursuant to the color television signal standards set by the Federal Communications Commission, chrominance information is broadcast to a color television receiver in the form of a phase and amplitude modulated color subcarrier wave. Recovery of chrominance information from the modulated subcarrier wave at the receiver is effected through the use of synchronous detection whereby the received wave is heterodyned with oscillations of the subcarrier frequency and of a phase appropriate to the particular form of information desired.

While the usual color image reproducer, such as, for example, the well known three-gun, shadow-mask color kinescope, requires three different color information inputs (usually in the form of color-difference signals of the character R–Y, G–Y and B–Y), it is customary for a variety of reasons, including circuit economy, to use only two color demodulators in the synchronous detection operation. The outputs of these two demodulators are then mixed appropriately to obtain a set of three signals of the form desired for reproducer operation. The circuitry employed for the mixing of the color demodulator outputs is generally referred to as a color matrix circuit.

In the RCA CTC–11 Color Television Chassis, described in the RCA Color Television Service Data pamphlet designated 1961 No. T6, a color matrix circuit arrangement is employed utilizing a trio of matrix amplifier tubes having a common cathode terminal and sharing a common cathode load. One of the matrix amplifier tubes receives at its control grid the output of one of the receiver's color demodulators, while another of the three matrix amplifier tubes receives at its control grid the output of the remaining color demodulator of the receiver. The control grid of the third matrix amplifier tube is not separately driven, but rather returned to a point of reference potential.

The demodulating or local oscillation phases associated with the operation of the two color demodulators of the receiver are designated X and Z, respectively, in the noted pamphlet, and are phases distinct from those with which R–Y, G–Y and B–Y color-difference signals are directly associated. The demodulators have matched plate load impedances. Selections of the X and Z phases, together with the choice of the common cathode impedance value, are made so as to carry out a matrixing scheme, via the common cathode coupling, whereby the R–Y color-difference signal appears at the plate of the matrix tube receiving X information at its control grid, the B–Y color-difference signal appears at the plate of the matrix tube receiving Z information at its control grid, and the G–Y color-difference signal appears at the plate of the remaining amplifier tube.

The general principles of this form of demodulator-matrix arrangement are set forth in U.S. Patent No. 2,830,112, issued on April 8, 1958, to Dalton H. Pritchard. While suitable selection of the parameter values of the circuitry does permit accurate attainment of the desired R–Y, B–Y, G–Y set of signals in the manner described therein, certain practical considerations may restrict the choice of certain parameter values or relations, rendering it difficult to obtain the desired R–Y and B–Y character of the outputs of the grid-driven matrix amplifier tubes without causing the output of the remaining matrix amplifier tube (cathode-driven only) to depart somewhat from accurate G–Y hue representation.

The present invention is directed to an improvement on the demodulator-matrix arrangement typified by the aforementioned CTC–11 circuit whereby accurate G–Y hue representation may be obtained from the common cathode matrix though still respecting the practical considerations that restrict parameter value choice. Achievement of this desired end is effected through use of a supplemental matrix coupling path, in addition to the above-described common cathode coupling. In accordance with a particular embodiment of the present invention, this supplemental matrix coupling path achieves feeding of the R–Y plate output of one matrix amplifier tube to the control grid of the matrix amplifier tube from which a G–Y output is desired.

The aforementioned FCC signal standards for color television involve certain weighting factors in the development of luminance signal information at the transmitter prior to the formation of the broadcast composite signal. Accurate receiver operation in the development of color-difference signals, and in the ultimate combination of luminance signal information therewith, requires that these weighting factors be taken into account. Additionally, differences in the phosphor efficiencies of the particular reproducer employed in the receiver must also be taken into account in the overall demodulator-matrix-luminance adding operation. With these ends in mind, relative adjustments in the gains of the respective demodulator tubes, and/or the respective amplifier tubes may be called for in a particular demodulator-matrix circuit.

In accordance with an embodiment of the present invention, parameter selection for achieving the proper amplitude relationships of the matrix circuit outputs, taking into account the weighting and phosphor efficiency factors noted above, includes choice of different cathode load impedances for the respective X and Z demodulators driving the matrix. Additionally, two of the three matrix amplifier tubes (viz., those respectively developing the R–Y and B–Y color difference signal outputs) are provided with negative feedback paths from plate to control grid.

The combination of use of these R–Y and B–Y negative feedback paths with the previously mentioned R–Y plate to G–Y grid cross-feed provides additional circuit advantages, not available if either of these features is used alone. To appreciate these additional advantages, it is necessary to consider certain additional aspects of matrix circuit operation. The common cathode matrix circuit of the CTC–11 receiver enjoys appreciable D.C. operating point stabilization through use of a common cathode pulsing technique. Negative-going "blanking" pulses (coinciding in time with the recurring horizontal blanking intervals of the received composite signal) are applied to the common cathode terminal of the matrix amplifier tubes with sufficient magnitude to drive the grid-cathode diode of each tube into conduction. A charge is developed on a grid capacitor, associated with the control grid of each matrix amplifier tube, which sets the matrix tube bias in a manner substantially independent of tube aging, power supply variations, etc. This feature is important for achieving proper saturation of the elements in the reproduced color image, particularly in view of the ultimate combination of the respective matrix outputs with the D.C. information of the luminance signal component of the received composite signal.

As a result of the common cathode pulsing for bias stabilization, the matrix amplifier tube outputs in the previously described CTC–11 matrixing arrangement include a blanking pulse component (which conveniently serves in the usual reproducer operation to achieve blanking of the reproducer during the horizontal retrace intervals). The previously described feature of the present invention relating to cross-feed from the R–Y plate to the G–Y grid, in addition to achieving the color information cross-coupling desired for matrix hue accuracy, involves (in a receiver utilizing the above-described cathode pulsing technique) a cross-coupling of the common blanking pulse component to the G–Y control grid. This results in an effective "bucking," to some degree, of the blanking pulse on the G–Y tube cathode, with a resultant change in the established D.C. operating point of the G–Y tube from that which would be obtained in the absence of the cross-feed connection. However, through the additional and conjoint use of the previously described negative feedback feature in operation of both the R–Y and B–Y matrix amplifier tubes, proper matching of the respective D.C. operating points is retained, since the negative feedback for these two tubes will also involve introduction of a comparable degree of "bucking" of the blanking pulse appearing at the cathodes of those tubes.

It is desirable from several points of view to provide (preferably full) D.C. coupling from the outputs of the matrix amplifier tubes to the electrodes of the color image reproducing device. In such D.C. coupled arrangements, the magnitude of each matrix amplifier tube's plate load impedance may play a determinative role in establishing the proper bias on the respectively associated reproducer electrode. In the copending application of Gordon E. Kelly and Paul E. Crookshanks, entitled Color Kinescope Operating and Testing Arrangements, filed January 15, 1963, and bearing Serial No. 251,644, a color kinescope drive and bias system is disclosed wherein full D.C. coupling from matrix amplifier plate to kinescope control grid is achieved. In a drive and bias scheme, such as disclosed in said Kelly and Crookshanks application, the kinescope electrode bias considerations can dictate use of a matrix amplifier tube plate load impedance of such relatively large magnitude as to be uncomfortably restrictive of the matrix amplifier bandwidth relative to that normally desired, unless compensation is provided. The negative feedback feature of the present invention effectively overcomes the bandwidth restriction otherwise imposed by a large plate load impedance, whereby use of a large plate load impedance for each of the R–Y and B–Y matrix tubes to achieve desired kinescope bias purposes may be tolerated. The conjoint use of the R–Y plate to G–Y grid cross-feed additionally provides the G–Y matrix amplifier tube with an effect sufficiently akin to the provision of a G–Y negative feedback path, at least insofar as bandwidth is concerned, as to likewise allow choice of its pate load impedance to suit the noted kinescope biasing purposes.

Accordingly, the primary object of the present invention is to provide novel and improved color matrix circuitry ensuring matrix accuracy as to both hue and saturation in the resultant color image, while permitting simplification or other improvement in associated circuits.

Other objects and advantages of the present invention will be readily apparent to those skilled in the art upon a reading of the following detailed description, and an inspection of the accompanying drawing in which a color television receiver, illustrated in block and schematic form, incorporates demodulator and matrix circuitry in accordance with an embodiment of the present invention.

The illustrated color television receiver incorporates a conventional line-up of tuner, IF amplifier and video detector, the tuner 11 converting received signals to intermediate frequency form for amplification in IF amplifier 13 and delivery therefrom to video detector 15 for recovery of the composite color television signal from demodulated IF carrier. The details of these segments of the receiver, as well as the other receiver components shown in block form in the drawing, may, for example, take the form of the elements of comparable function in the RCA CTC–11 color television receiver, described in the aforementioned RCA Color Television Service Data pamphlet designated 1961 No. T6.

The composite signal output of video detector 15 is amplifier in video amplifier 17, which supplies outputs to a plurality of different signal component utilization channels.

An output of video amplifier 17 is supplied to a sync separator 19, which separates the deflection synchronizing components from the remainder of the composite signal for application to suitable vertical and horizontal deflection circuits, 21 and 23, respectively; these circuits apply respective horizontal and vertical deflection current waves to a deflection yoke (not illustrated) associated with the receiver's color reproducer (the illustrated reproducer comprising a tri-gun, shadow mask color kinescope 40). The horizontal deflection circuits 23 also supply a pulse output, timed to recur during successive horizontal retrace intervals, to a horizontal blanking amplifier 25. An amplified horizontal blanking pulse output, negative-going relative to chassis ground, appears at the blanking pulse output terminal P.

Another output of video amplifier 17 is applied to a luminance amplifier 27 serving to develop an amplified luminance component at its output terminal L. A luminance amplifier load resistor 29 is coupled between the output terminal L and the receiver's B+ supply. The luminance signal output at terminal L is applied directly to the cathode 41R of the red phosphor-energizing electron gun of the color kinescope 40. A luminance signal component of relatively adjustable amplitude is also applied to the cathodes 41B and 41G of the respective blue and green kinescope guns. The luminance signal amplitude adjustment for the blue gun is effected by means of a potentiometer 35, while the luminance signal adjustment for the green gun is achieved through use of potentiometer 37. One fixed terminal of each of the potentiometers 35 and 37 is directly connected to the output terminal L. The remaining fixed terminal of each potentiometer is directly connected to the junction of voltage dividing resistors 31 and 33, which are connected in series between a positive output terminal of the receiver's B+ supply and chassis ground. The respective cathodes 41B and 41G are directly connected to the adjustable taps of potentiometers 35 and 37, respectively.

The electrode structure of color kinescope 40 additionally includes a trio of control grids, 43R, 43B and 43G; a trio of screen grids, 45R, 45B and 45G; a focusing electrode structure 47; and a final accelerating or ultor electrode 49. The ultor electrode 49 is connected to a high voltage output terminal U of the receiver's high voltage supply (not illustrated), at which terminal appears a suitably regulated high voltage for effecting final acceleration of the kinescope beams. The focusing electrode structure 47 of kinescope 40 is connected to a focus voltage output terminal of the high voltage supply; a suitably adjustable unidirectional voltage of intermediate magnitude appears at this terminal for optimizing the focusing of the respective kinescope beams. The screen grid electrodes 45R, 45B and 45G are individually connected to respective energizing terminals $S_R$, $S_B$, $S_G$; individually adjustable unidirectional voltages are supplied to each of these energizing terminals.

Another output of video amplifier 17 is supplied to a burst separator 52, which responds to an appropriate keying waveform (derived, for example, from the horizontal deflection circuits 23) to selectively develop an output comprising the color synchronizing component of the received composite signal. The burst output of separator 52 is compared in phase, in phase detector 54, with an output of a color reference oscillator 58, nominally operating at a color subcarrier frequency rate, to develop a control voltage output, indicative of departures, if any, of the oscillator 58 from proper phase synchronization. The control voltage output of the phase detector 54 is used to suitably vary the reactance presented by a reactance tube 56 to the operating frequency determining circuits of oscillator 58, whereby to maintain the oscillator 58 properly synchronized.

Another output of video amplifier 17 is applied to a chrominance amplifier 50, conventionally taking the form of a bandpass amplifier for selectively amplifying the chrominance component of the received composite signal. The amplified chrominance component output, comprising a modulated subcarrier wave, appears at the chrominance amplifier output terminal C, and is applied across the chrominance signal amplitude adjusting potentiometer 51. A segment of the resistive element of potentiometer 51 is shunted by a resistor 53, coupled between a grounded end terminal and an intermediate fixed tap of potentiometer 51.

Demodulation of the received color subcarrier wave is effected by a pair of synchronous demodulators, utilizing respective demodulator tubes 60 and 80. The demodulator tubes 60 and 80, which may, in practice, preferably comprise tubes of the familiar pentagrid type, have been illustrated as pentodes for drawing simplification. Each of the tubes 60 and 80 is provided with a first control grid (63 and 83, respectively), to which the adjustable tap of potentiometer 51 is connected via a series inductor 55. The respective demodulator tube cathodes are individually connected to chassis ground via respective, differently valued cathode resistors 71 and 91. The respective screen grids, 65 and 85, of the demodulator tubes are connected to a common positive bias potential point (suitably bypassed to chassis ground by capacitor 74) by respective screen grid resistors 72 and 92. Each of the demodulator tubes 60 and 80 is provided with an additional control grid (67 and 87, respectively) to which locally generated oscillations of respectively different phases are applied. This application is achieved by direct connection of grid 67 to an output terminal X of color reference oscillator 58, and by direct connection of grid 87 to a different output terminal Z of the oscillator 58.

The respective anodes 69 and 89 of the demodulator tubes are connected to a common positive operating potential supply point (suitably bypassed to chassis ground by a capacitor 76) by respective anode load resistors 75 and 95, having matched resistance values. The signals developed at the respective anodes 69 and 89 are color-difference signals, repreesntative of respective hues, which are determined by the particular oscillation phases delivered to the respective oscillator output terminals X and Z; these output signals represent the difference frequency product of the heterodyning in each demodulator tube of the received modulated subcarrier waves with the local color oscillator outputs. Each anode circuit is provided with suitable filtering elements to attenuate the frequencies of the input signals; shunt capacitor 73 and series inductor 77 perform this function for the output at anode 69, while shunt capacitor 93 and series inductor 97 serve this purpose in conjunction with anode 89.

Processing of the X and Z color-difference signal outputs of demodulator tubes 60 and 80 to produce a set of color-difference signal outputs of the form R–Y, B–Y and G–Y is performed by a matrix circuit arrangement utilizing three amplifier tubes 110, 120 and 130. Each of the amplifier tubes, illustratively, takes the form of a triode. The cathode 111 of tube 110, the cathode 121 of tube 120 and the cathode 131 of tube 130 are all directly connected together at a common cathode terminal K. A common cathode impedance is provided for the three tubes by means of a resistor 140 connected between terminal K and chassis ground.

The control grid 113 of tube 110 is coupled to the anode 69 of demodulator tube 60 via a coupling capacitor 79 in series with the filter inductor 77. Tube 110 is also provided with a grid leak resistor 114 directly connected between control grid 113 and cathode 111.

Tube 120 is provided with a control grid 123, coupled to the anode 89 of demodulator tube 80 via a coupling capacitor 99 in series with the filter inductor 97. Resistor 124, directly connected between cathode 121 and control grid 123 serves as a grid leak resistor for tube 120.

The control grid 133 of the remaining matrix amplifier tube 130 is coupled via the series combination of a coupling capacitor 149, a resistor 145 and an inductor 147 to the positive operating potential supply point to which demodulator anode resistors 75 and 95 are commonly returned. Resistor 134 connected between control grid 133 and cathode 131, serves as a grid leak resistor for tube 130.

The respective anodes 115, 125, 135 of the matrix tubes 110, 120 and 130 are connected to a common operating potential supply point by means of respective anode load resistors 116, 126 and 136.

Tube 110 is additionally provided with a negative feedback path, comprising a resistor 150 coupled between the anode 115 and the junction of filter inductor 77 and coupling capacitor 79. Tube 120 is likewise provided with a negative feedback path comprising a resistor 160 coupled between the anode 125 and the junction of filter inductor 97 and coupling capacitor 99. Additionally, a cross-feed path is provided between the matrix amplifier tubes 110 and 130, this cross-feed path comprising a resistor 170 coupled between anode 115 and the junction of resistor 145 and coupling capacitor 149.

Coupling capacitors 79, 99 and 149, have equal capacitance value; filter inductors 77, 97 and 147, correspondingly, have equal inductance values. Resistor 145 has a resistance value chosen to substantially match the resistance value presented by the parallel combination of a demodulator tube and a demodulator load resistor. Gridleak resistors 114, 124 and 134 are equal in resistance value; likewise, the matrix anode load resistors 116, 126 and 136 have matching magnitudes. The common cathode terminal K is connected to the horizontal blanking pulse output terminal P of blanking amplifier 25.

The matrix circuit output terminals R–Y, G–Y and B–Y are connected, respectively, to the anodes 115, 135 and 125 by means of respective limiting resistors 117, 137 and 127. Resistor 117 is shunted by a capacitor 119, while the resistor 137 is shunted by a capacitor 139; capacitor 129 is connected in shunt with resistor 127. The matrix circuit output terminals R–Y, G–Y and B–Y are respectively directly connected to the red gun control grid 43R, the green gun control grid 43G and the blue gun control grid 43B of color kinescope 40.

Achievement of proper operation of the above-described demodulator-matrix arrangement involves choice of the respectively different demodulator cathode resistors 71 and 91, choice of the respectively different reference oscillation phases X and Z, and choice of the impedance value of the common cathode resistor 140 such that the mixing of the respective amplitudes of the selected X and Z color-difference signals via the common cathode coupling produces, at the respective anodes 115 and 125, color-difference signals accurately representative of R–Y and B–Y information, respectively. The magnitude of the cross-feed resistor 170, and the resultant degree of R–Y signal cross-coupling to the grid of the tube 130, is chosen so that this R–Y information will provide the proper correction of the mixed signal appearing across the common cathode resistor 140 (as the result of the previously mentioned parameter choices), whereby there will be produced at the anode 135 a color-difference signal accurately representative in hue of the G–Y content in the received signal. The magnitudes of the respective negative feedback resistors 150 and 160, and the resultant reduction in effective gain of the matrix tubes 110 and 120, are properly related to the X and Z signal amplitude differences established by the previously mentioned demodulator cathode resistor value selections, to the weighting factors necessitated by the broadcast signal standards, and to the relative amplitude adjustments dictated by the phosphor efficiency differences associated with the color kinescope 40, so as to accurately obtain the proper amplitude relationship between the three matrix output signals delivered to the terminals R–Y, G–Y and B–Y.

With parameter values selected in accordance with the foregoing goals, the matrix anode resistors 116, 126 and 136 may all be of equal and relatively large impedance value, as desired for previously discussed kinescope bias purposes; i.e., equal load resistor values may be employed in a kinescope drive arrangement providing direct, unattenuated coupling of the matrix anode outputs to the kinescope control grids, the equal load resistor values facilitating achievement of matched control grid bias settings. The relatively large value for each matrix load resistor, required for proper kinescope grid bias setting in this simple and direct drive arrangement, is tolerable from a bandwidth point of view by virtue of the compensating effect provided by the indicated use of the resistors 150, 160 and 170.

The previously discussed cathode pulsing technique is employed in the described matrix circuit to stabilize the operating points of the respective matrix amplifier tubes. Substantial equalization of these stable operating points is not disturbed by the pulse "bucking" introduced by cross-feed resistor 170, due to the additional pulse "bucking" effects inhering in the conjoint use of the feedback resistors 150 and 160. This maintenance of substantial equalization of stable operating points for the three matrix tubes results in the maintenance of substantially equal and stable kinescope control grid biasing points, in view of the accompanying use of equal value matrix load resistors and simple, direct kinescope drive couplings.

The overall effect of practice and principles of the present invention is to enable use of the economical X, Z type of demodulator-matrix combination with accurate results with regard to both hue and saturation, while facilitating the use of a kinescope drive and biasing arrangement having advantages of circuit economy, signal gain conservation and operating point stability.

Set forth in the table below are a set of values for the various parameters of the illustrated circuit, which set has been found to provide satisfactory operation. It will be appreciated that these values are given by way of example, and that other values may be substituted therefor without departing from the principles of the present invention.

| | |
|---|---|
| Resistor **29** | 5,600 ohms. |
| Resistor **31** | 6,800 ohms. |
| Resistor **33** | 39,000 ohms. |
| Potentiometer **35** | 6,000 ohms. |
| Potentiometer **37** | 6,000 ohms. |
| Potentiometer **51** | 750 ohms. |
| Resistor **53** | 220 ohms. |
| Resistor **71** | 150 ohms. |
| Resistor **91** | 100 ohms. |
| Resistors **72**, **92** (each) | 56 ohms. |
| Resistors **75**, **95** (each) | 3,900 ohms. |
| Resistors **114**, **124**, **134** (each) | 1 megohm. |
| Resistors **116**, **126**, **136** (each) | 27,000 ohms. |
| Resistors **117**, **127**, **137** (each) | 100,000 ohms. |
| Resistor **140** | 270 ohms. |
| Resistor **145** | 3,300 ohms. |
| Resistor **150** | 270,000 ohms. |
| Resistor **160** | 270,000 ohms. |
| Resistor **170** | 270,000 ohms. |
| Capacitor **74** | .047 microfarad. |
| Capacitor **76** | .01 microfarad. |
| Capacitors **73**, **93** (each) | 33 micromicrofarads. |
| Capacitors **79**, **99**, **149** (each) | .01 microfarad. |
| Capacitors **119**, **129**, **139** (each) | .01 microfarad. |
| Coil **55** | 5.6 microhenries. |
| Coils **77**, **97**, **147** (each) | 620 microhenries. |
| Tubes **60**, **80** (each) | 6GY6. |
| Tubes **110**, **120**, **130** (each) | ½ 6FQ7. |
| Kinescope **40** | 21FJP22. |

What is claimed is:

1. In a color television receiver including a source of a first color difference signal, and a source of a second color difference signal, matrixing apparatus comprising the combination of
- a trio of amplifying devices, each including an input electrode, an output electrode and a common electrode;
- an impedance;
- means for utilizing said impedance for returning the common electrodes of all of said amplifying devices, in common, to a point of reference potential;
- respective means associated with the output electrodes of said devices for providing each amplifying device with a separate output circuit;
- means for coupling the input electrode of a first one of said trio of amplifying devices to said first color difference signal source;
- means for coupling the input electrode of a second one of said amplifying devices to said second color difference signal source;
- means for returning the input electrode of the remaining one of said amplifying devices to said point of reference potential;
- and means for coupling signals from the output electrode of said first amplifying device to the input electrode of said remaining device.

2. In a color television receiver including a source of a first color difference signal, and a source of a second color difference signal, matrixing apparatus comprising the combination of
- a trio of amplifying devices, each including an input electrode, an output electrode and a common electrode;
- an impedance;
- means for utilizing said impedance for returning the common electrodes of all of said amplifying devices, in common, to a point of reference potential;
- respective means associated with the output electrodes of said devices for providing each amplifying device with a separate output circuit;
- means for coupling the input electrode of a first one of said trio of amplifying devices to said first color difference signal source;
- means for coupling the input electrode of a second one of said amplifying devices to said second color difference signal source;
- means for returning the input electrode of the remaining one of said amplifying devices to said point of reference potential;
- means for coupling signals from the output electrode of said first amplifying device to the input electrode of said remaining amplifying device;
- means for additionally coupling signals from the output electrode of said first amplifying device to the input electrode of said first amplifying device;
- and means for coupling signals from the output electrode of said second amplifying device to the input electrode of said second amplifying device.

3. In a color television receiver including a source of a first color difference signal, a source of a second color difference signal, and a color kinescope having a trio of control grid electrodes, matrixing apparatus comprising the combination of
- a trio of amplifying devices, each including an input electrode, an output electrode and a common electrode;
- an impedance;
- means for utilizing said impedance for returning the common electrodes of all of said amplifying devices, in common, to a point of reference potential;

respective means associated with the output electrodes of said devices for providing each amplifying device with a separate output circuit;

means for coupling the input electrode of a first one of said trio of amplifying devices to said first color difference signal source;

means for coupling the input electrode of a second one of said amplifying devices to said second color difference signal source;

means for applying signals from the output electrode of said first amplifying device to the input electrode of the remaining one of said amplifying devices;

means for establishing a negative feedback path between the output and input electrodes of said first amplifying device;

means for establishing a negative feedback path between the output and input electrodes of said second amplifying device;

and means for providing a direct current conductive connection between the output electrode of each of said amplifying devices and a respectively different one of said trio of control grid electrodes.

4. In a color television receiver including a source of a first color difference signal, a source of a second color difference signal, and a color kinescope having a trio of control grid electrodes, matrixing apparatus comprising the combination of a trio of amplifying devices, each including an input electrode, an output electrode and a common electrode;

an impedance;

means for utilizing said impedance for returning the the common electrode of all of said amplifying devices, in common, to a point of reference potential;

respective means associated with the output electrodes of said devices for providing each amplifying device with a separate output circuit;

means for coupling the input electrode of a first one of said trio of amplifying devices to said first color difference signal source;

means for coupling the input electrode of a second one of said amplifying devices to said second color difference signal source;

means for establishing a signal path between the output electrode of said first amplifying device and the input electrode of the remaining one of said trio of amplifying devices;

means for additionally coupling signals from the output electrode of said first amplifying device to the input electrode of said first amplifying device;

means for coupling signals from the output electrode of said second amplifier device to the input electrode of said second amplifier device;

means for providing a direct current conductive connection between the output electrode of each of said amplifying devices and a respectively different one of said trio of control grid electrodes;

and means, including a source of periodically recurring pulses coupled across said common impedance, for establishing a relatively stable bias on the input electrode of each of said amplifying devices.

5. In a color television receiver including a source of a first color difference signal, and a source of a second difference signal, and a color kinescope having a trio of control grid electrodes, matrixing apparatus comprising the combination of a trio of amplifying devices, each including an input electrode, an output electrode and a common electrode;

an impedance;

means for utilizing said impedance for returning the common electrodes of all of said amplifying devices, in common, to a point of reference potential;

respective means associated with the output electrodes of said devices for providing each amplifying device with a separate output circuit, each of said output circuits presenting a load to the associated amplifying device, with all of said loads presented being substantially equal in magnitude;

means for coupling the input electrode of a first one of said trio of amplifying devices to said first color difference signal source;

means for coupling the input electrode of a second one of said amplifying devices to said second color difference signal source;

means for returning the input electrode of the remaining one of said amplifying devices to said point of reference potential;

means for coupling the output electrode of said first amplifying device to the input electrode of said remaining amplifying device;

means for applying signals from the output electrode of said first amplifying device to the input electrode of said first amplifying device;

means for applying signals from the output electrode of said second amplifier device to the input electrode of said second amplifier device;

means for providing a direct current conductive connection between the output electrode of each of said amplifying devices and a respectively different one of said trio of control grid electrodes;

and means for commonly establishing a relatively stable bias on the input electrode of each of said amplifying devices, said establishing means including a source of periodically recurring pulses, and means for applying said pulses across said impedance, the polarity and amplitude of said pulses being such as to cause current conduction between the input and common electrode of each amplifying device.

6. In a color television receiver including a first color demodulator, a second color demodulator, and a tri-gun, color kinescope, each gun of said kinescope including a control grid, matrixing apparatus comprising the combination of first, second and third electron tubes, each including a cathode, control grid, and anode;

means providing a common cathode resistor for all of said electron tubes;

an anode load resistor for each of said electron tubes, all of said anode load resistors being substantially equal in resistance value;

means for coupling the control grid of said first tube to said first color demodulator;

means for coupling the control grid of said second tube to said second color demodulator;

a cross-coupling resistor connected between the anode of said first tube and the control grid of said third tube;

means for coupling signals from the anode of said first tube to the control grid of said first tube;

means for coupling signals from the anode of said second tube to the control grid of said second tube;

means for providing a direct current conductive connection between the anode of each of said tubes and a respectively different one of said kinescope control grids;

and means for applying periodically recurring pulses to said common cathode resistor, the polarity and amplitude of said pulses being such as to cause current conduction between the cathode and control grid of each of said tubes.

7. In a color television receiver including a color kinescope having a trio of control grids, apparatus comprising the combination of first and second color demodulating devices having unequal loads;

a trio of amplifying devices, each including an input electrode, an output electrode and a common electrode;

an impedance;
means for utilizing said impedance for returning the common electrodes of all of said amplifying devices, in common, to a point of reference potential;
respective means associated with the output electrodes of said devices for providing each amplifying device with a separate output circuit, each of said output circuits presenting a load to the associated amplifying device, with all of said loads presented being substantially equal in magnitude;
means including a capacitor for coupling the input electrode of a first one of said trio of amplifying devices to said first color demodulating device;
means including a capacitor for coupling the input electrode of a second one of said amplifying devices to said second color demodulating device;
means including a capacitor for coupling the input electrode of the remaining one of said trio of amplifying devices to said point of reference potential;
means for applying signals from the output electrode of said first amplifying device to the input electrode of said remaining amplifying-device;
means for additionally coupling signals from the output electrode of said first amplifying device to the input electrode of said first amplifying device;
means for coupling signals from the output electrode of said second amplifier device to the input electrode of said second amplifier device;
means for providing a direct current conductive connection between the output electrode of each of said amplifying devices and a respectively different one of said trio of control grids;
and a source of periodically recurring pulses coupled across said common impedance, the polarity and amplitude of said pulses being such as to cause current conduction between the input and common electrode of each amplifying device.

References Cited by the Examiner

Admiral TV Installation, Alignment, and Service Data: #928–2 (series 25 chassis, Admiral Corporation, Chicago, Illinois. Printed December 1962.

DAVID G. REDINBAUGH, *Primary Examiner.*

J. A. O'BRIEN, *Assistant Examiner.*